(12) United States Patent
Wu et al.

(10) Patent No.: US 10,984,832 B2
(45) Date of Patent: Apr. 20, 2021

(54) VIDEO PROCESSING SYSTEM USING RING BUFFER AND RACING-MODE RING BUFFER ACCESS CONTROL SCHEME

(71) Applicant: MEDIATEK INC., Hsin-Chu (TW)

(72) Inventors: Ming-Long Wu, Hsinchu (TW); Chia-Yun Cheng, Hsinchu (TW); Yung-Chang Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/734,384

(22) Filed: Jan. 5, 2020

(65) Prior Publication Data

US 2020/0143836 A1   May 7, 2020

Related U.S. Application Data

(62) Division of application No. 15/646,095, filed on Jul. 11, 2017, now abandoned.

(Continued)

(51) Int. Cl.
*G11B 20/10* (2006.01)
*H04N 19/423* (2014.01)
(Continued)

(52) U.S. Cl.
CPC ....... *G11B 20/10527* (2013.01); *G09G 5/393* (2013.01); *H04N 19/423* (2014.11); *H04N 21/435* (2013.01); *H04N 21/4341* (2013.01); *H04N 21/4343* (2013.01); *H04N 21/43635* (2013.01); *H04N 21/43637* (2013.01); *H04N 21/44004* (2013.01); *G09G 2360/127* (2013.01);

(Continued)

(58) Field of Classification Search
CPC .... G11B 20/10527; G11B 2020/10666; G11B 2020/10768; G11B 2020/10787; G11B 2020/10796; H04N 19/423; H04N 21/4341; H04N 21/4343; H04N 21/435; H04N 21/43635; H04N 21/43637; H04N 21/44004; G09G 5/393; G09G 2360/127
USPC ........................................................ 386/353
See application file for complete search history.

(56) References Cited

U.S. PATENT DOCUMENTS 6,009,231 A    12/1999  Aoki
2004/0141553 A1  7/2004  Bhatia
(Continued)

FOREIGN PATENT DOCUMENTS

CN  102625193 A    8/2012
TW  200301062      6/2003
TW  201308986 A1   2/2013

*Primary Examiner* — Thai Q Tran
*Assistant Examiner* — Nienru Yang
(74) *Attorney, Agent, or Firm* — Winston Hsu

(57) ABSTRACT

A video processing system includes a storage device, a receiving circuit, an audio/video demultiplexing circuit, a video decoder, and a display engine. The storage device includes a data buffer, a bitstream buffer, and a display buffer. An output of the receiving circuit is written into the data buffer. An input of the audio/video demultiplexing circuit is read from the data buffer, and an output of the audio/video demultiplexing circuit is written into the bitstream buffer. An input of the video decoder is read from the bitstream buffer, and an output of the video decoder is written into the display buffer. An input of the display engine is read from the display buffer. Each of the data buffer, the bitstream buffer, and the display buffer is a ring buffer.

10 Claims, 14 Drawing Sheets

Related U.S. Application Data

(60) Provisional application No. 62/361,091, filed on Jul. 12, 2016.

(51) Int. Cl.
*H04N 21/44* (2011.01)
*H04N 21/434* (2011.01)
*H04N 21/435* (2011.01)
*H04N 21/4363* (2011.01)
*G09G 5/393* (2006.01)

(52) U.S. Cl.
CPC ............. *G11B 2020/1074* (2013.01); *G11B 2020/10666* (2013.01); *G11B 2020/10768* (2013.01); *G11B 2020/10787* (2013.01); *G11B 2020/10796* (2013.01)

(56) References Cited

U.S. PATENT DOCUMENTS

| | | | |
|---|---|---|---|
| 2006/0057957 A1* | 3/2006 | Yoo | H04N 5/4401 455/3.04 |
| 2008/0215644 A1* | 9/2008 | Beric | H04N 19/433 |
| 2008/0303838 A1* | 12/2008 | Funakubo | H04N 19/61 345/545 |
| 2013/0286973 A1* | 10/2013 | Selia | H04W 88/08 370/329 |
| 2015/0155002 A1* | 6/2015 | Cheng | H04N 19/129 386/355 |

\* cited by examiner

VIDEO PROCESSING SYSTEM USING RING BUFFER AND RACING-MODE RING BUFFER ACCESS CONTROL SCHEME

CROSS REFERENCE TO RELATED APPLICATION

This is a divisional application of U.S. application Ser. No. 15/646,095 filed Jul. 11, 2017, which claims the benefit of U.S. provisional application No. 62/361,091 filed Jul. 12, 2016. The entire contents of the related applications, including U.S. application Ser. No. 15/646,095 and U.S. provisional application No. 62/361,091, are incorporated herein by reference.

BACKGROUND

The disclosed embodiments of the present invention relate to video data processing, and more particularly, to a video processing system using a ring buffer and a racing-mode ring buffer access control scheme.

One conventional video system design may include a video transmitting system (which may serve as a video recording system) and a video receiving system (which may serve as a video playback system). Regarding the video transmitting system, it may be composed of a plurality of processing stages, including a video encoder, an audio/video multiplexing circuit, a transmitting circuit, etc. Regarding the video receiving system, it may be composed of a plurality of processing stages, including a receiving circuit, an audio/video demultiplexing circuit, a video decoder, a display engine, etc. However, the conventional video system design may fail to meet the requirements of some ultra-low latency applications due to long playback latency at the video receiving system. Hence, there is a need for an innovative low-latency and high-performance video receiving system.

SUMMARY

In accordance with exemplary embodiments of the present invention, a video processing system using a ring buffer and a racing-mode ring buffer access control scheme is proposed to solve the above-mentioned problem.

According to one aspect of the present invention, an exemplary video processing system is disclosed. The exemplary video processing system includes a storage device, a receiving circuit, an audio/video demultiplexing circuit, a video decoder, and a display engine. The storage device includes a data buffer, a bitstream buffer, and a display buffer. The receiving circuit is arranged to receive packets and unpack the packets to write payload data of the packets into the data buffer. The audio/video demultiplexing circuit is arranged to fetch an input data from the data buffer, and perform an audio/video demultiplexing operation upon the fetched input data to write data of a video bitstream into the bitstream buffer, wherein the fetched input data comprise payload data of at least one of the packets. The video decoder is arranged to fetch data of the video bitstream from the bitstream buffer, and perform a video decoding operation upon the fetched data of the video bitstream to write pixel data of a reconstructed video frame into the display buffer. The display engine is arranged to fetch pixel data of the reconstructed video frame from the display buffer, and drive a display device according to the fetched pixel data of the reconstructed video frame. The data buffer is a ring buffer coupled between the receiving circuit and the audio/video demultiplexing circuit. The bitstream buffer is a ring buffer coupled between the audio/video demultiplexing circuit and the video decoder. The display buffer is a ring buffer coupled between the video decoder and the display engine.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
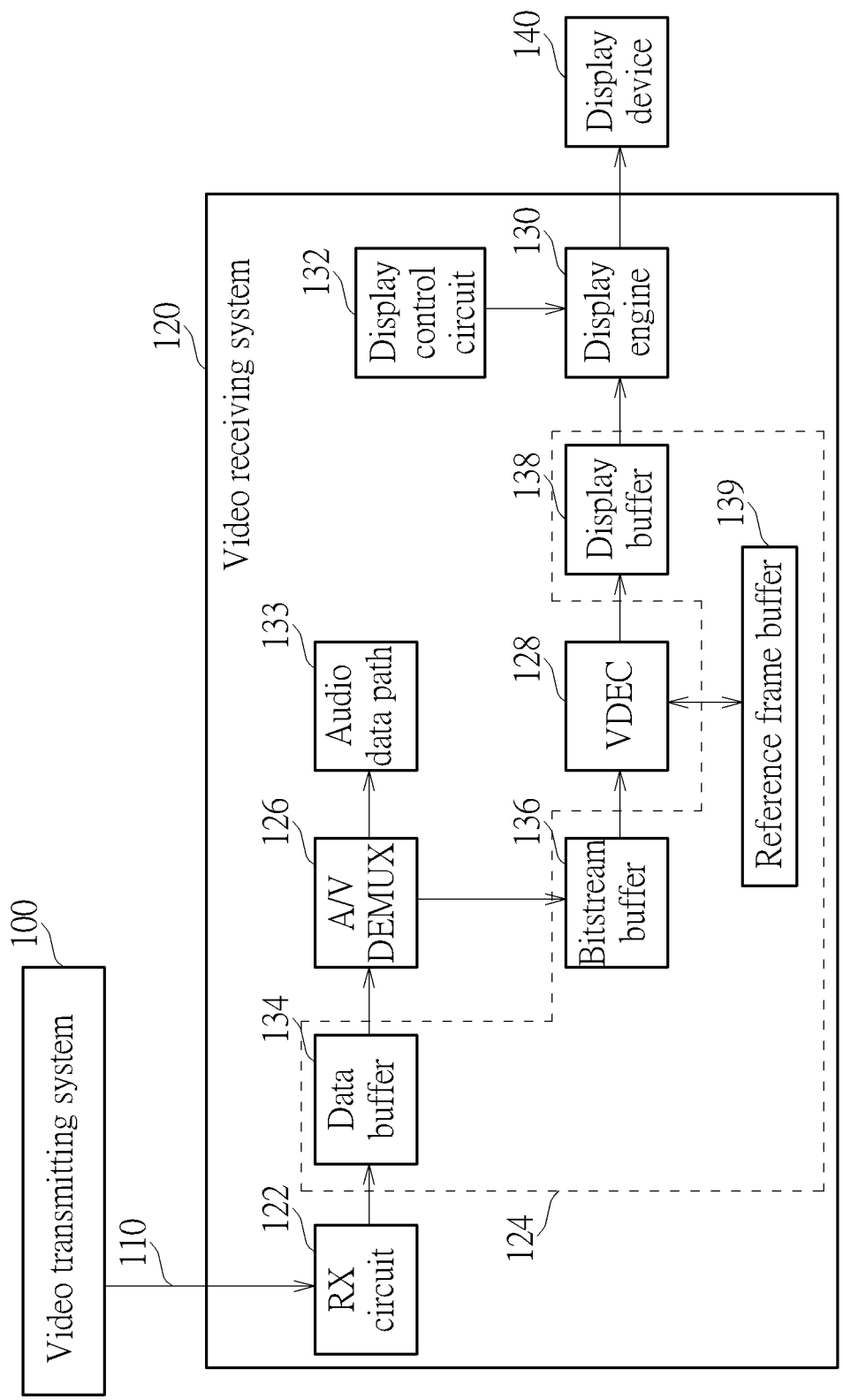
FIG. 1 is a block diagram illustrating a video receiving system according to an embodiment of the present invention.

FIG. 1 is a block diagram illustrating a video receiving system according to an embodiment of the present invention. The video receiving system 120 communicates with a video transmitting system 100 via a communication link 110. Byway of example, but not imitation, the video transmitting system 100 and the video receiving system 120 may be employed by an ultra-low latency application such as a virtual reality (VR) application. In this embodiment, the video receiving system 120 includes a receiving (RX) circuit 112, a storage device 124, an audio/video demultiplexing circuit (denoted by "A/V DEMUX") 126, a video decoder (denoted by "VDEC") 128, a display engine 130, and a display control circuit 132. The storage device 124 includes a data buffer 134, a bitstream buffer 136, a display buffer 138, and a reference frame buffer 139.

The video transmitting system 100 may serve as a video recording system that is used to encode video frames provided from one or more video sources (not shown) and then transmit encoded video data to the video receiving system 120 via the communication link 110. The video receiving system 120 may serve as a video playback system that is used to receive encode video frame data from the communication link 110 and then decode the encoded video frame data to generate reconstructed video frames to a display device 140 for video playback. For example, the display device 140 may be a display screen of a VR headset. In addition, the communication link 110 may be implemented using a wired communication link or a wireless communication link.

The receiving circuit 122 receives packets from the communication link 110, and unpacks the packets to write payload data of the packets into the data buffer 134. The payload data of the packets may include encoded video data, encoded audio data and other user defined data. The audio/video demultiplexing circuit 126 fetches an input data from the data buffer 134, and performs an audio/video demultiplexing operation upon the fetched input data, where the fetched input data may include payload data of at least one of the packets received by the receiving circuit 122. Due to audio/video demultiplexing, a video bitstream and an audio bitstream are separated and forwarded to the bitstream buffer 136 and the audio data path 133, respectively. In other words, the audio/video demultiplexing circuit 126 performs the audio/video demultiplexing operation upon the fetched input data to write data of a video bitstream into the bitstream buffer 136 and supply data of an audio bitstream to the audio data path 133. The audio bitstream is decoded by the audio data path 133 to obtain audio data for audio playback. Regarding the video processing and playback, the video decoder 128 fetches data of the video bitstream from the bitstream buffer 136, and performs a video decoding operation upon the fetched data of the video bitstream to write pixel data of a reconstructed video frame into the display buffer 138.

A coding block in a video frame may be encoded using an intra prediction mode or an inter prediction mode. When a coding block in a current video frame is encoded using the inter prediction mode, a predicted block used to reconstruct the coding block of the current video frame is found in a reference frame which is a previously reconstructed video frame and stored in the reference frame buffer 139. Hence, a reconstructed video frame generated from decoding a previous video frame by the video decoder 128 is further stored in the reference frame buffer 139 to serve as a reference frame that may be used to decode a current video frame.

The display engine 130 is a driving circuit controlled by the display control circuit 132. The display engine 130 fetches pixel data of the reconstructed video frame from the display buffer 138, and drives the display device 140 according to the fetched pixel data of the reconstructed video frame.

In this embodiment, the storage device 124 may be implemented using an internal storage device, an external storage device, or a combination of an internal storage device and an external storage device. For example, the internal storage device may be a static random access memory (SRAM) or may be flip-flops; and the external storage device may be a dynamic random access memory (DRAM) or may be a flash memory.

Since different processing stages in the video receiving system 120 may have different data processing rates, one buffer is coupled between different processing stages. As shown in FIG. 1, the data buffer 134 is coupled between the preceding receiving circuit 122 and the following audio/video demultiplexing circuit 126, the bitstream buffer 136 is coupled between the preceding audio/video demultiplexing circuit 126 and the following video decoder 128, and the display buffer 138 is coupled between the preceding video decoder 128 and the following display engine 130. If one buffer coupled between different processing stages with different data processing rates is implemented using a small-sized buffer, the small-sized buffer may suffer from underflow or overflow during processing of one video frame. This may lead to extra access latency. If one buffer coupled between different processing stages with different data processing rates is implemented using a large-sized buffer, the large-sized buffer may avoid underflow and overflow during processing of one video frame at the expense of the buffer cost. In this embodiment, at least one of data buffer 134, bitstream buffer 136, and display buffer 138 may be implemented using a ring buffer. Due to inherent characteristics of a ring buffer, a storage space of a small-sized ring buffer can be reused, such that the small-sized ring buffer may act as a large-sized buffer. In addition, a racing-mode ring buffer access control scheme may be employed to prevent a following processing stage from retrieving wrong data from the ring buffer and/or prevent a preceding processing stage from overwriting buffered data that is not processed by the following processing stage yet. To put it simply, the present invention proposes using a ring buffer between different processing stages in a video receiving system for achieving a balance between the access latency and the buffer cost.

Figure 2:
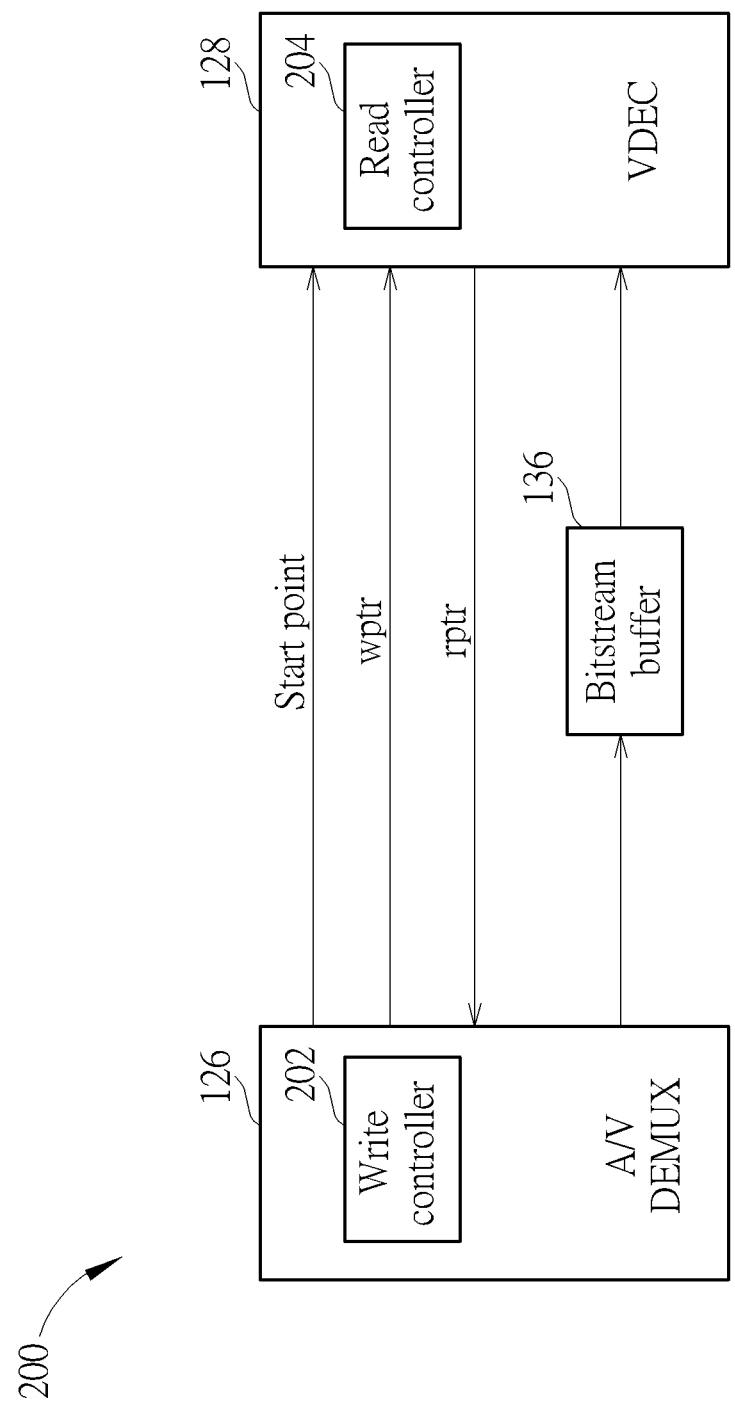
FIG. 2 is a diagram illustrating a first video processing system according to an embodiment of the present invention.
Figure 3:
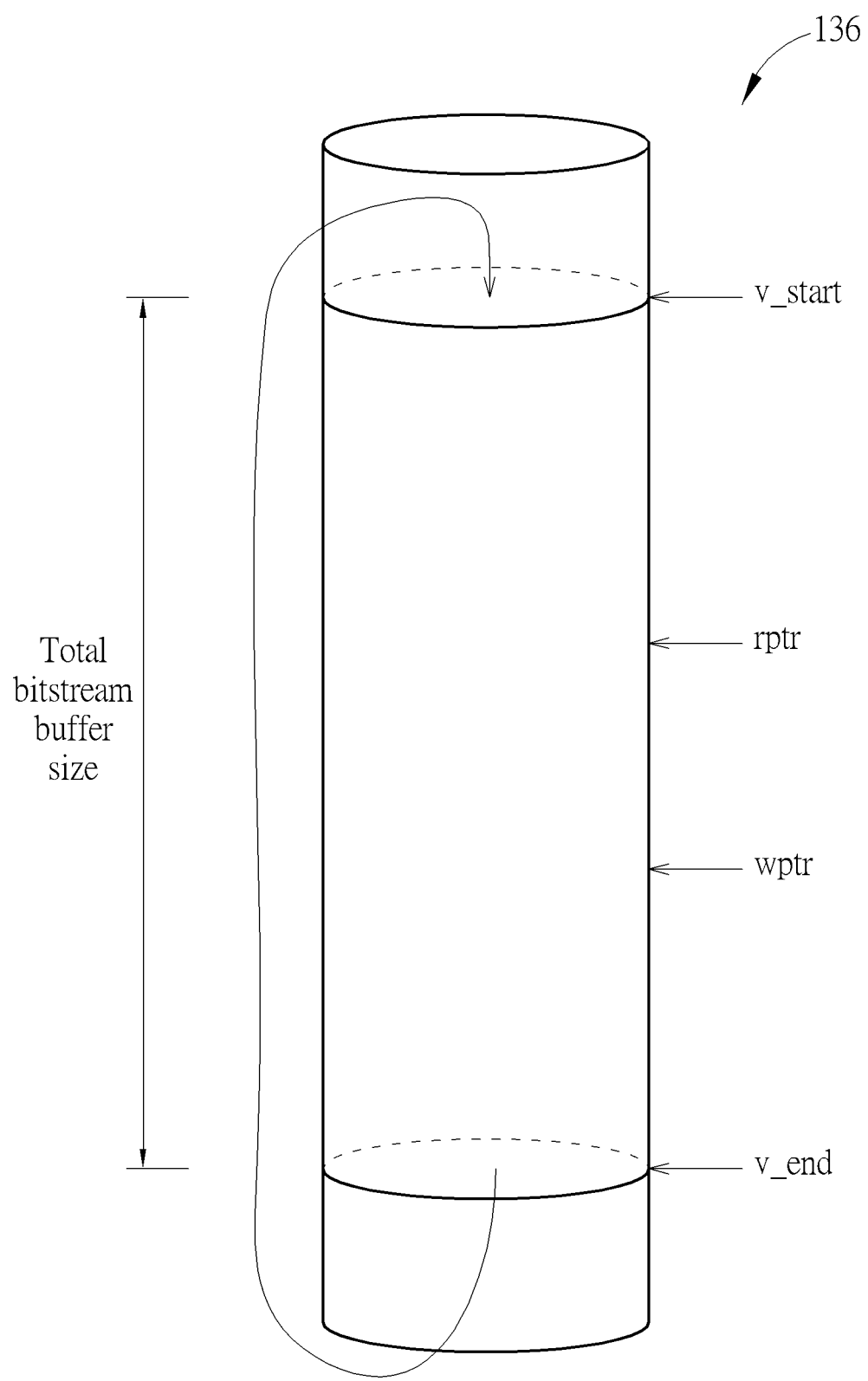
FIG. 3 is a diagram illustrating a bitstream buffer implemented using a ring buffer according to an embodiment of the present invention.

FIG. 2 is a diagram illustrating a first video processing system according to an embodiment of the present invention. The video processing system 200 may be a part of the video receiving system 120 shown in FIG. 1. In this embodiment, the video processing system 200 includes the audio/video demultiplexing circuit 126, the video decoder 128, and the bitstream buffer 136. In addition, the bitstream buffer 136 is implemented using a ring buffer as shown in FIG. 3. Further, a racing-mode ring buffer access control scheme is employed to prevent the video decoder 128 from retrieving wrong data from the ring buffer (i.e., bitstream buffer 136), and prevent the audio/video demultiplexing circuit 126 from overwriting buffered data that is not processed by the video decoder 128 yet.

As shown in FIG. 3, the bitstream buffer 136 is a ring buffer having a top address v_start and a bottom address v_end. In one embodiment, the top address v_start and the bottom address v_end may be physical addresses that define a continuous physical storage space. In another embodiment, the top address v_start and the bottom address v_end may be virtual addresses that define a continuous logical storage space. Hence, the total bitstream buffer size is equal to (v_start−v_end). The bitstream buffer 136 can be accessed (read/written) in a direction from the top address v_start to the bottom address v_end and then rolling back to the top address v_start from the bottom address v_end.

During audio/video demultiplexing of an input data (which contains encoded video data and encoded audio data) of one video frame, the audio/video demultiplexing circuit 126 writes data of a video bitstream into the bitstream buffer 136, such that a write pointer wptr (which is indicative of a current write address of writing data of the video bitstream into the bitstream buffer 136) moves downwards. Specifically, the audio/video demultiplexing circuit 126 analyzes the input data (which contains encoded video data and encoded audio data), and writes data of a video bitstream into the bitstream buffer 136. Hence, the audio/video demultiplexing circuit 126 updates the write pointer wptr according to the size of video data stored into the bitstream buffer 136. When the write pointer wptr reaches the bottom address v_end, the write pointer wptr will roll back to the top address v_start, such that writing data of the video bitstream into the bitstream buffer 136 continues seamlessly.

During video decoding of a video bitstream of one video frame, the video decoder 128 reads data of the video bitstream from the bitstream buffer 136, such that a read pointer rptr (which is indicative of a current read address of reading data of the video bitstream from the bitstream buffer 136) moves downwards. When the read pointer rptr reaches the bottom address v_end, the read pointer wptr will roll back to the top address v_start, such that reading data of the video bitstream from the bitstream buffer 136 continues seamlessly.

After an old data segment stored in the bitstream buffer 136 is read and processed by the video decoder 128, a storage area which buffers the old data segment can be reused to buffer a new data segment generated from the audio/video demultiplexing circuit 126. In addition, after the old data segment (which has been read and processed by the video decoder 128) is overwritten by the new data segment generated from the audio/video demultiplexing circuit 126, the storage area can be read by the video decoder 128 again to obtain the new data segment. Due to inherent characteristics of the ring buffer, the write pointer wptr chases the read pointer rptr, and the read pointer rptr also chases the write pointer wptr. A racing mode between the read pointer rptr and the write pointer wptr may be employed to control access (read/write) of the bitstream buffer 136 that is a ring buffer. In accordance with the racing-mode ring buffer access control scheme, the audio/video demultiplexing circuit 126 is configured to include a write controller 202 which updates the write pointer wptr to the video decoder 128, and the video decoder 128 is configured to include a read controller 204 which updates the read pointer rptr to the audio/video demultiplexing circuit 126.

Figure 4:
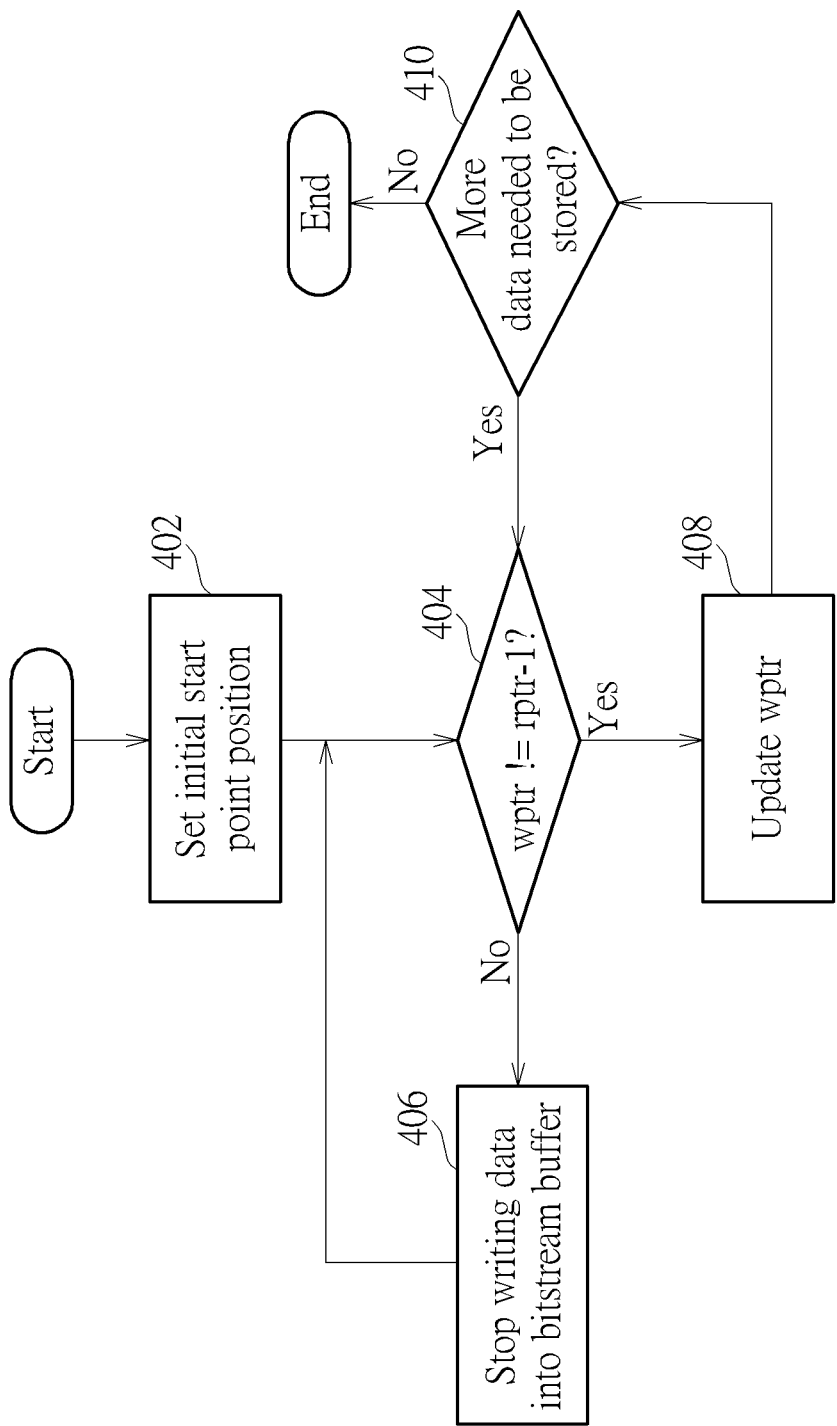
FIG. 4 is a flowchart illustrating a method of controlling a write operation of a bitstream buffer according to an embodiment of the present invention.

FIG. 4 is a flowchart illustrating a method of controlling a write operation of the bitstream buffer 136 according to an embodiment of the present invention. Provided that the result is substantially the same, the steps are not required to be executed in the exact order shown in FIG. 4. The method shown in FIG. 4 may be employed by the write controller 202. At step 402, the write controller 202 sets an initial start point position, wherein a start point is indicative of a start address of a video bitstream stored in the bitstream buffer 136 by the audio/video demultiplexing circuit 126. Since the bitstream buffer 136 is a ring buffer, the initial start point position is set by an address between the top address v_start and the bottom address v_end. In addition, at the beginning of writing data of the video bitstream into the bitstream buffer 136, a first data segment of the video bitstream is written into a memory word addressed by a write address that is the initial start point position.

At step 404, the write controller 202 compares its write pointer wptr with the received read pointer rptr to check if a distance between the write pointer wptr and the read pointer rptr does not reach a threshold (e.g., wptr !=rptr−1). When the distance between the write pointer wptr and the read pointer rptr does not reach the threshold (e.g., wptr !=rptr−1), the write controller 202 can continue or resume writing data of the video bitstream into the bitstream buffer 136 (step 408). In this example, the threshold is equal to a step size of incrementing the write pointer wptr. However, this is for illustrative purposes only, and is not meant to be a limitation of the present invention.

When the distance between the write pointer wptr and the read pointer rptr reaches the threshold (e.g., wptr==rptr−1), meaning that the write pointer wptr will catch up the read pointer rptr soon, the write controller 202 stops writing data of the video bitstream into the bitstream buffer 136 (step 406). In this way, the racing-mode ring buffer access control scheme prevents the audio/video demultiplexing circuit 126 from overwriting encoded video data that is not processed by the video decoder 128 yet. The write controller 202 does not resume writing data of the video bitstream into the bitstream buffer 136 until the video decoder 128 updates the read pointer rptr to a new value. Hence, when the distance between the write pointer wptr and the read pointer rptr does not reach the threshold (e.g., wptr !=rptr−1) due to the read pointer rptr updated to a new value under a condition that writing data of the video bitstream into the bitstream buffer 136 is paused, the write controller 202 resumes writing data of the video bitstream into the bitstream buffer 136 (steps 404 and 408).

At step 408, the write controller 202 updates the write pointer wptr to move the write pointer wptr for writing data of the video bitstream into a next write address of the bitstream buffer 136. For example, the write controller 202 updates the write pointer wptr according to the following pseudo code.

```
if (wptr==v_end)
    wptr = v_start
else
    wptr = wptr+1
```

After data of the video bitstream is written into the bitstream buffer 136 according to the updated write pointer wptr, the write controller 202 checks if there are more data needed to be stored into the bitstream buffer 136 (step 410). When there is no data needed to be stored into the bitstream buffer 136, the write operation is ended. Otherwise, the control flow proceeds with step 404.

Figure 5:
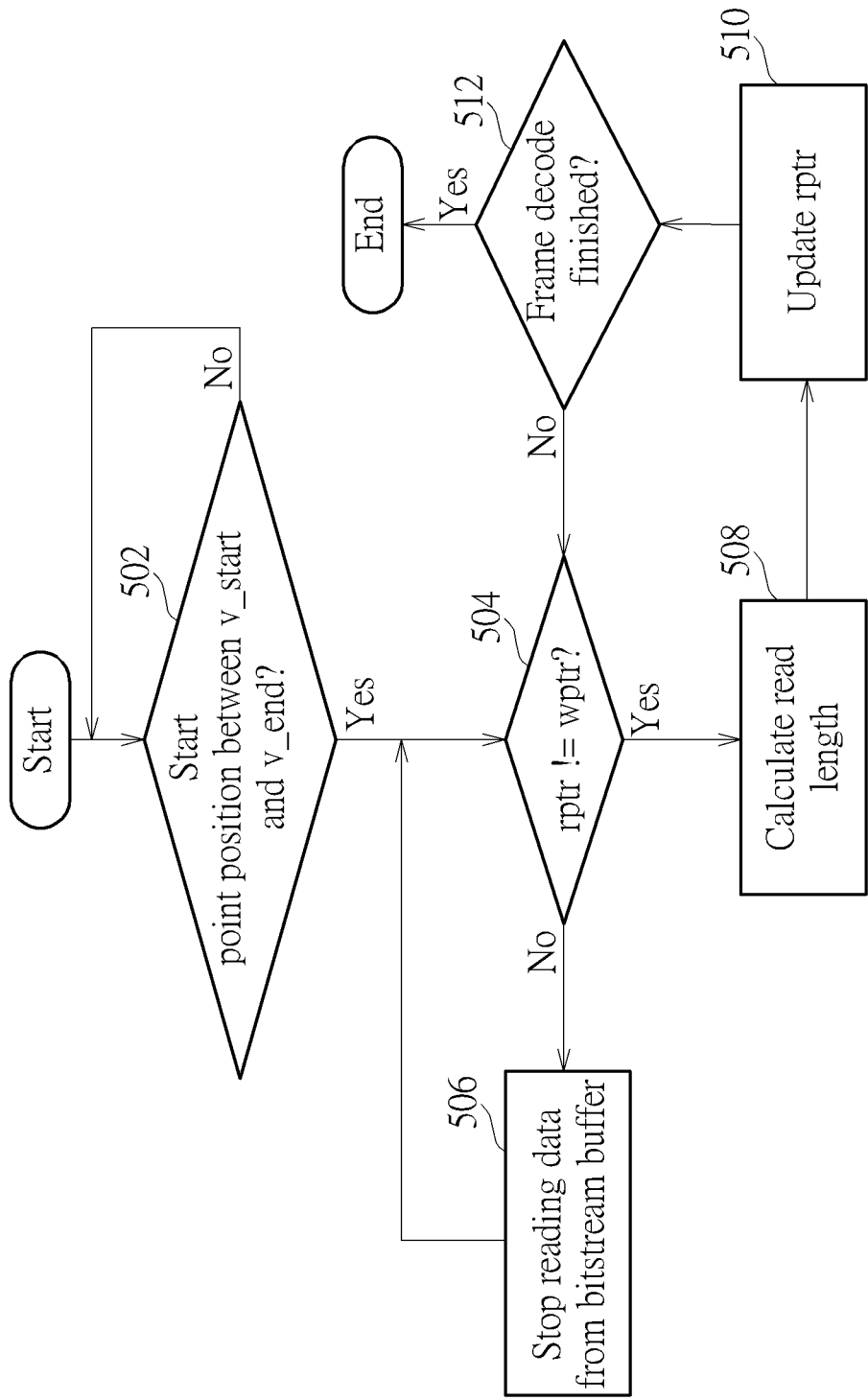
FIG. 5 is a flowchart illustrating a method of controlling a read operation of a bitstream buffer according to an embodiment of the present invention.

FIG. 5 is a flowchart illustrating a method of controlling a read operation of the bitstream buffer 136 according to an embodiment of the present invention. Provided that the result is substantially the same, the steps are not required to be executed in the exact order shown in FIG. 5. The method shown in FIG. 5 may be employed by the read controller 204. At step 502, the read controller 204 checks if the start point position is between the top address v_start and the bottom address v_end. As mentioned above, a start point is indicative of a start address of a video bitstream stored in the bitstream buffer 136 that is a ring buffer. The racing-mode ring buffer access control scheme is only active when the start point position is between the top address v_start and the bottom address v_end. Hence, the control flow proceeds with step 504 when the start point position is between the top address v_start and the bottom address v_end.

At step 504, the read controller 204 compares its read pointer rptr with the received write pointer wptr to check if the read pointer rptr does not catch up the write pointer wptr (e.g., rptr !=wptr). When the read pointer rptr does not catch up the write pointer wptr (e.g., rptr !=wptr), the read controller 204 can continue or resume reading data of the video bitstream from the bitstream buffer 136 (step 508).

However, when the read point rptr catches up the write pointer wptr (e.g., rptr==wptr), the read controller 204 stops reading data of the video bitstream from the bitstream buffer 136 (step 506). In this way, the racing-mode ring buffer access control scheme prevents the video decoder 128 from retrieving wrong encoded video data from the bitstream buffer 136. The read controller 204 does not resume reading data of the video bitstream from the bitstream buffer 136 until the audio/video demultiplexing circuit 126 updates the write pointer wptr to a new value. Hence, when the read pointer rptr does not catch up the write pointer wptr (e.g., rptr !=wptr) due to the write pointer wptr updated to a new value under a condition that reading data of the video bitstream from the bitstream buffer 136 is paused, the read controller 204 resumes reading data of the video bitstream from the bitstream buffer 136 (steps 504 and 508).

At step 508, the read controller 204 calculates a read length which indicates an amount of data still waiting to be fetched from the bitstream buffer 136 to the video decoder 128 for further processing. For example, the read controller 204 calculates the read length according to the following pseudo code.

```
if (wptr < rptr)
    length = (v_end-rptr) + (wptr-v_start)
else
    length = wptr-rptr
```

At step 510, the read controller 204 updates the read pointer rptr to move the read pointer rptr for reading data of the video bitstream from a next read address of the bitstream buffer 136. For example, the read controller 204 updates the read pointer rptr according to the following pseudo code.

```
if (rptr==v_end)
    rptr = v_start
else
    rptr = rptr+1
```

After data of the video bitstream is read from the bitstream buffer 136 according to the updated read pointer rptr, the read controller 204 checks if the frame decode operation is finished (step 512). When the frame decode operation is finished, the read operation is ended. Otherwise, the control flow proceeds with step 504.

Figure 6:
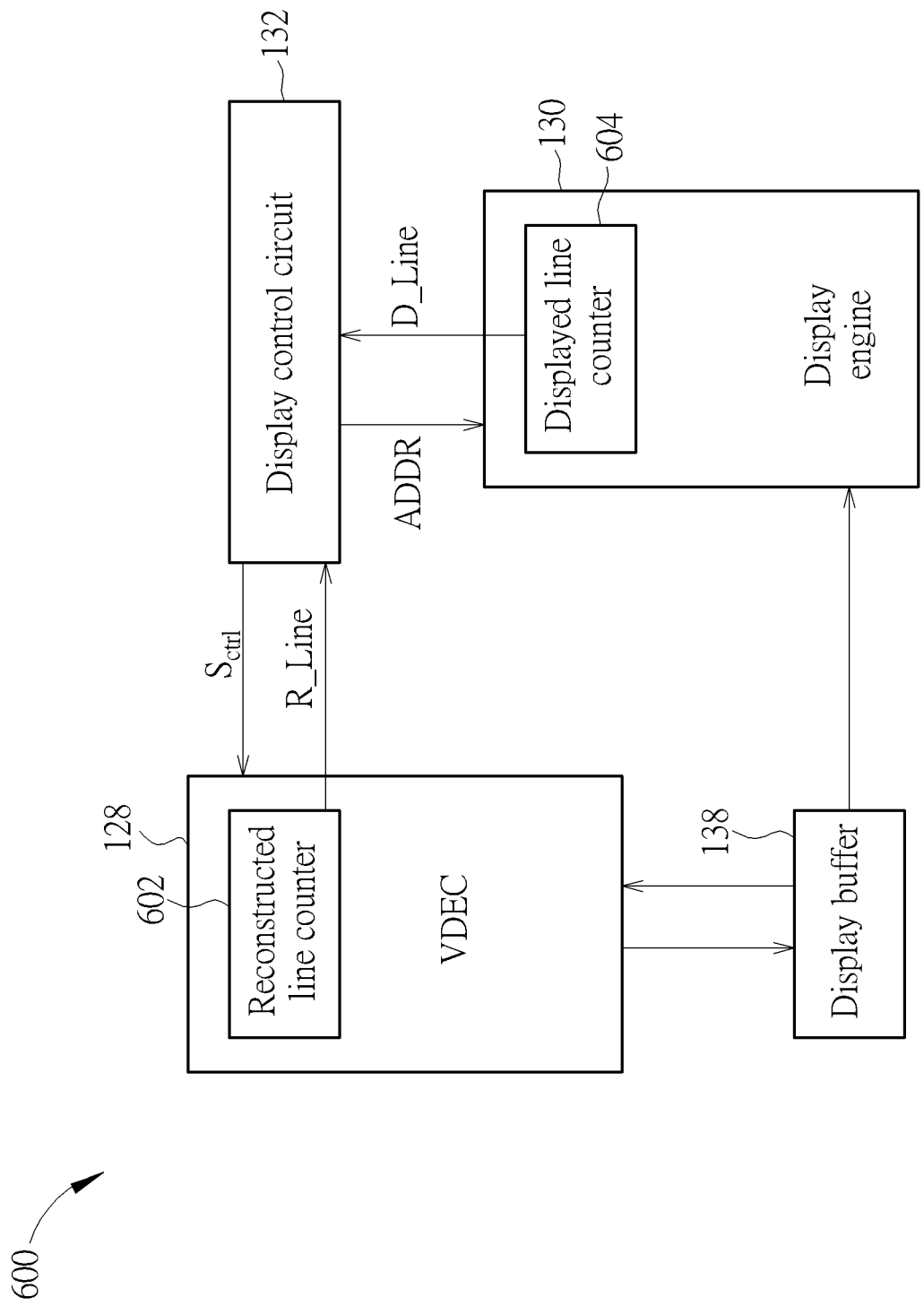
FIG. 6 is a diagram illustrating a second video processing system according to an embodiment of the present invention.
Figure 7:
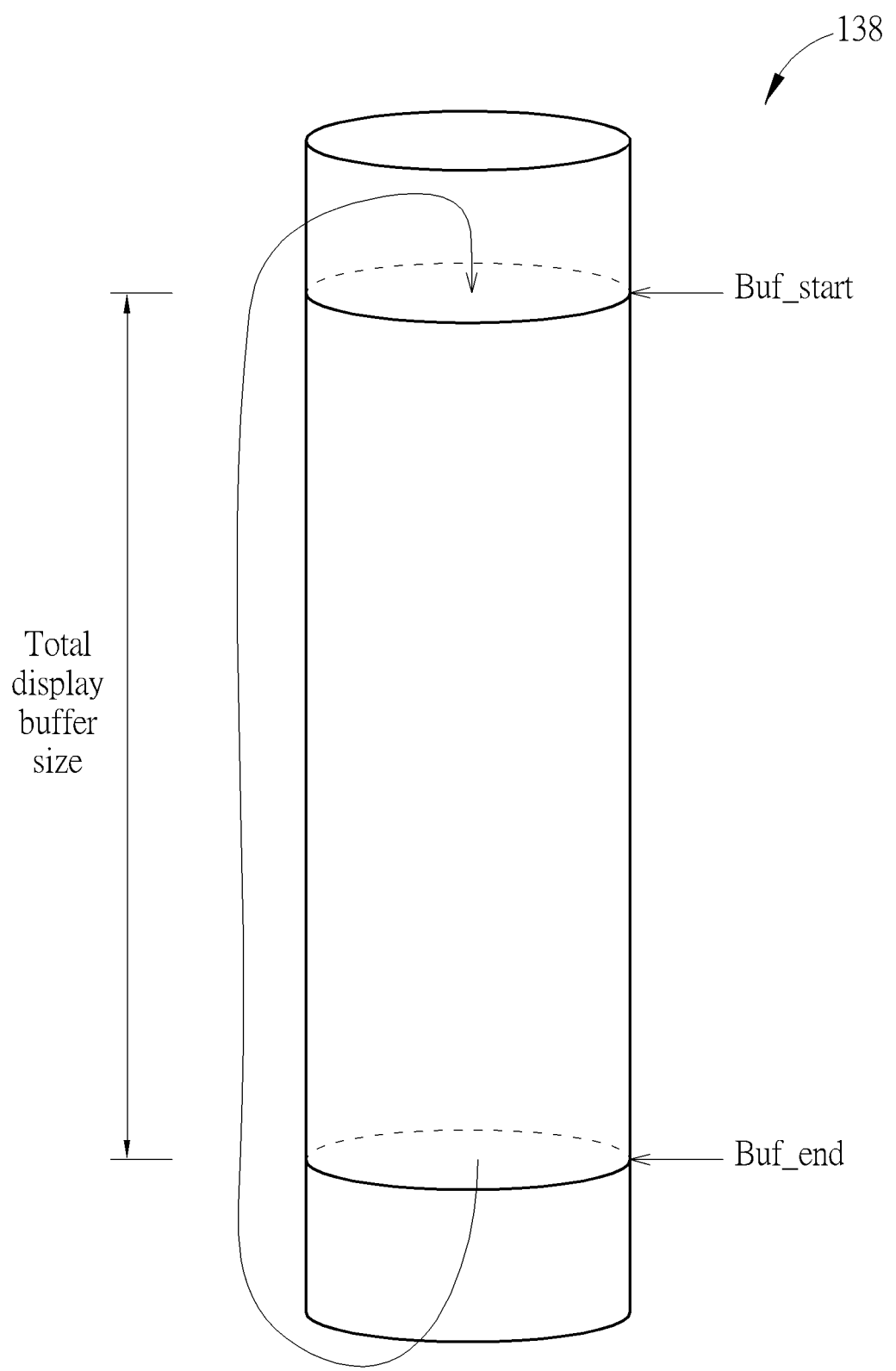
FIG. 7 is a diagram illustrating a display buffer implemented using a ring buffer according to an embodiment of the present invention.

FIG. 6 is a diagram illustrating a second video processing system according to an embodiment of the present invention. The video processing system 600 may be a part of the video receiving system 120 shown in FIG. 1. In this embodiment, the video processing system 600 includes the video decoder 128, the display engine 130, the display control circuit 132, and the display buffer 138. In addition, the display buffer 138 is implemented using a ring buffer as shown in FIG. 7. A racing-mode ring buffer access control scheme is employed to prevent the video decoder 138 from overwriting buffered pixel data that is not used by the display engine 130 for video playback yet.

As shown in FIG. 7, the display buffer 138 is a ring buffer having a top address Buf_start and a bottom address Buf_end. In one embodiment, the top address Buf_start and the bottom address Buf_end may be physical addresses that define a continuous physical storage space. In another embodiment, the top address Buf_start and the bottom address Buf_end may be virtual addresses that define a continuous logical storage space. Hence, the total display buffer size is equal to (Buf_start−Buf_end). For example, the total display buffer size may be equal to an amount of pixel data of n (n≥2) coding block rows, where each coding block contains m (m≥1) pixel lines. A coding block is a basic processing unit of a video coding standard. For example, when the video coding standard is H.264, one coding block is one macroblock (MB). For another example, when the video coding standard is VP9, one coding block is one super block (SB). For yet another example, when the video coding standard is HEVC (High Efficiency Video Coding), one coding block is one coding tree unit (CTU).

Since the display buffer 138 is a ring buffer, the display buffer 138 can be accessed (read/written) in a direction from the top address Buf_start to the bottom address Buf_end and then rolling back to the top address Buf_start from the bottom address Buf_end.

During video decoding of one video frame, the video decoder 128 writes pixel data of a reconstructed video frame into the display buffer 138, such that a write address of the pixel data moves downwards. When the write address reaches the bottom address Buf_end, the write address will roll back to the top address Buf_start, such that writing pixel data of the reconstructed video frame into the display buffer 138 continues seamlessly.

During video playback of a reconstructed video frame, the display engine 130 reads pixel data of the reconstructed video frame from the display buffer 138, such that a read address of the pixel data moves downwards. When the read address reaches the bottom address Buf_end, the read address will roll back to the top address Buf_start, such that reading pixel data of the reconstructed video frame from the display buffer 138 continues seamlessly.

After an old data segment stored in the display buffer 138 is read and processed by the display engine 130, a storage area which buffers the old data segment can be reused to buffer a new data segment generated from the video decoder 128. In addition, after the old data segment (which has been read and processed by the display engine 130) is overwritten by the new data segment generated from the video decoder 128, the storage area can be read by the display engine 130 again to obtain the new data segment. The video playback of a video frame is not started unless some pixel data of the video frame are already available in the display buffer 138. Due to inherent characteristics of the ring buffer, the write address chases the read address. To achieve smooth video playback, a read operation of the display buffer 138 cannot be paused. Hence, a racing mode between the read operation and the write operation may be employed to control the write operation of the display buffer 138 that is a ring buffer. In accordance with the racing-mode ring buffer access control scheme, the video decoder 128 is configured to include a reconstructed line counter 602 which maintains a reconstructed line count value R_Line indicative of the number of pixel lines that are reconstructed by the video decoder 128, and the display engine 130 is configured to include a displayed line counter 604 which maintains a displayed line count value D_Line indicative of the number of pixel lines that are displayed on the display device 140 through the display engine 130.

In this embodiment, the video decoder 126 is arranged to perform block-based decoding, and the display engine 130 is arranged to perform scan line based displaying. Hence, the reconstructed line counter 602 increases the reconstructed line count value R_Line by a first increment value (e.g., a value equal to a height of one coding block) each time one coding block row (e.g., MB row, SB row, or CTU row) is completely decoded. For example, assuming that one coding block has N pixels in a column direction, the reconstructed line count value R_Line is updated by R_Line+N when one coding block row is completely decoded. In addition, the displayed line counter 604 increases the displayed line count value D_Line by a second increment value (e.g., "1") each time one pixel line is completely displayed. For example, the displayed line count value D_Line is updated by D_Line+1 when one pixel line is completely displayed.

Figure 8:
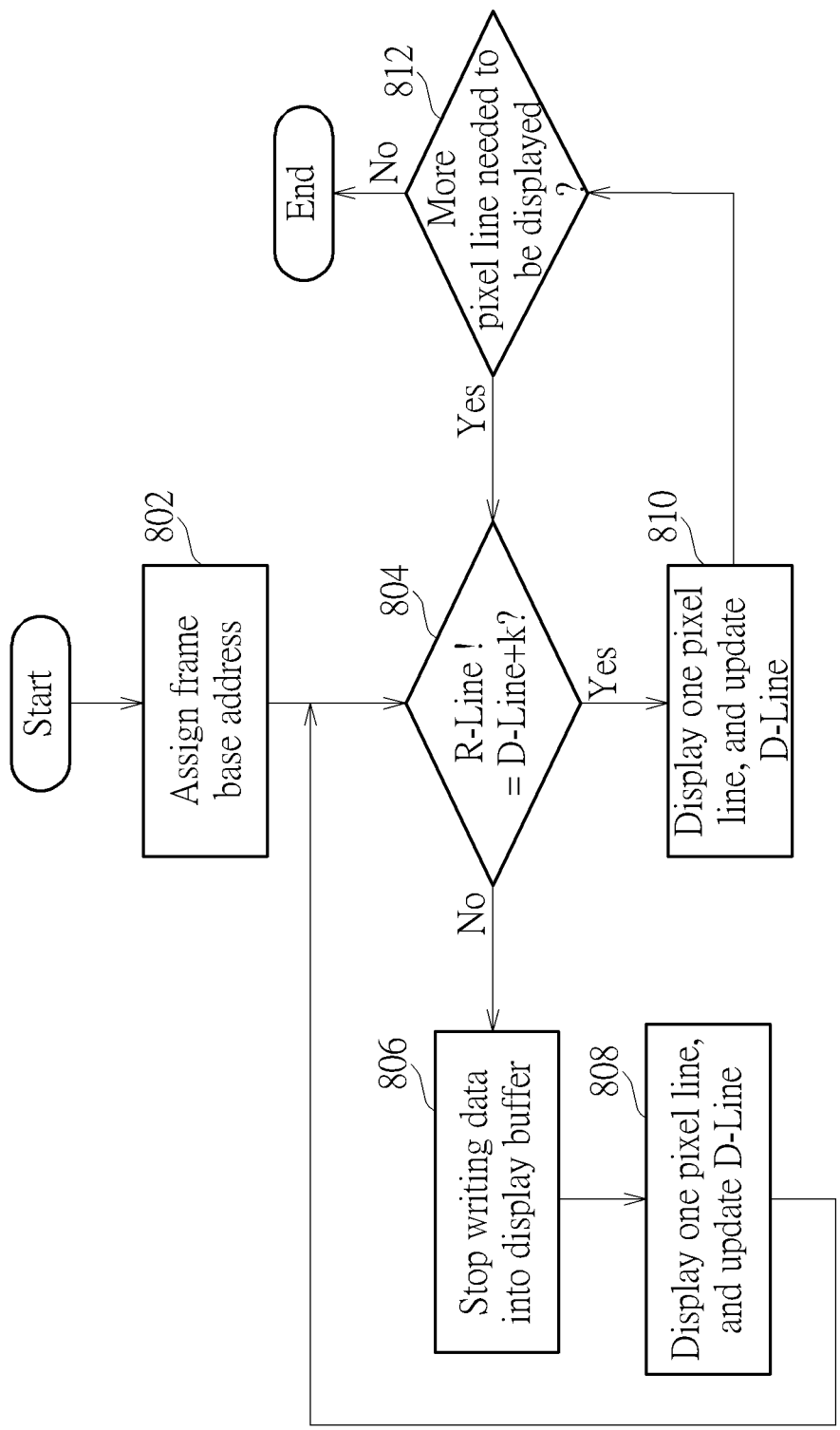
FIG. 8 is a flowchart illustrating a display control method according to an embodiment of the present invention.

FIG. 8 is a flowchart illustrating a display control method according to an embodiment of the present invention. Provided that the result is substantially the same, the steps are not required to be executed in the exact order shown in FIG. 8. The method shown in FIG. 8 may be employed by the display controller 132. In this example, the video decoder 128 updates the reconstructed line count value R_Line to the display control circuit 132, and the display engine 130 updates the displayed line count value D_Line to the display control circuit 132. Hence, the display control circuit 132 can refer to the reconstructed line count value R_Line to know the decoding status of a current video frame, and can refer to the displayed line count value D_Line to know the display status of the current video frame. Initially, the display control circuit 132 compares the reconstructed line count value R_Line and the displayed line count value D_Line to determine if video playback of a reconstructed video frame can be started. When R_Line≥D_Line, the display control circuit 132 assigns a frame base address ADDR to the display engine (step 802), where the frame base address is indicative of a start address of the reconstructed video frame stored in the display buffer 138 by the video decoder 128.

At step 804, the display control circuit 132 compares the reconstructed line count value R_Line and the displayed line count value D_Line to determine if the write operation of the display buffer 138 should be stopped. In this example, the display control circuit 132 checks if a distance between the reconstructed line count value R_Line and the displayed line count value D_Line does not reach a threshold (e.g., R_Line !=D_Line+k), where the threshold k may be set by any positive integer value, depending upon the actual design considerations. When the distance between the reconstructed line count value R_Line and the displayed line count value D_Line does not reach the threshold (e.g., R_Line !=D_Line+k), the display control circuit 132 does not assert a control signal $S_{ctrl}$ for instructing the video decoder 128 to stop writing pixel data of the reconstructed video frame into the display buffer 138. Next, the flow proceeds with step 810, such that the display engine 130 continues reading pixel data of the reconstructed video frame from the display buffer 138 and driving the display device 140 to display the pixel data of the reconstructed video frame. Hence, at step 810, one pixel line is displayed on the display device 140 through the display engine 130, and the displayed line counter 604 updates the displayed line count value D_Line (e.g., D_Line=D_Line+1) correspondingly.

However, when the distance between the reconstructed line count value R_Line and the displayed line count value D_Line reaches the threshold (e.g., R_Line==D_Line+k), meaning that the video decoding speed is much faster than the video playback speed, the display control circuit 132 asserts the control signal $S_{ctrl}$ for instructing the video decoder 128 to stop writing pixel data of the reconstructed video frame into the display buffer 138 (step 806). In this way, the racing-mode ring buffer access control scheme prevents the video decoder 128 from overwriting pixel data that is not processed by the display engine 130 for video playback yet. As mentioned above, a read operation of the display buffer 138 cannot be paused for achieving smooth video playback. Next, the flow proceeds with step 808, such that the display engine 130 continues reading pixel data of the reconstructed video frame from the display buffer 138 and driving the display device 140 to display the pixel data of the reconstructed video frame. Similarly, at step 808, the displayed line counter 604 updates the displayed line count value D_Line (e.g., D_Line=D_Line+1) correspondingly.

The display control circuit 132 does not instruct the video decoder 128 to resume writing pixel data of the reconstructed video frame into the display buffer 138 until the display engine 130 (particularly, the displayed line counter 604) updates the displayed line count value D_Line to a new value. Hence, when the distance between the reconstructed line count value R_Line and the displayed line count value D_Line does not reach the threshold (e.g., R_Line !=D_Line+k) due to the displayed line count value D_Line updated to a new value under a condition that writing pixel data of the reconstructed video frame into the display buffer 138 is paused, the display control circuit 132 de-asserts the control signal $S_{ctrl}$ for instructing the video decoder 128 to resume writing pixel data of the reconstructed video frame into the display buffer 138 (steps 804 and 810).

At step 812, the display control circuit 132 checks if there are more pixel lines needed to be displayed. When no pixel line is needed to be displayed, the display control operation is ended. Otherwise, the control flow proceeds with step 804.

Figure 9:
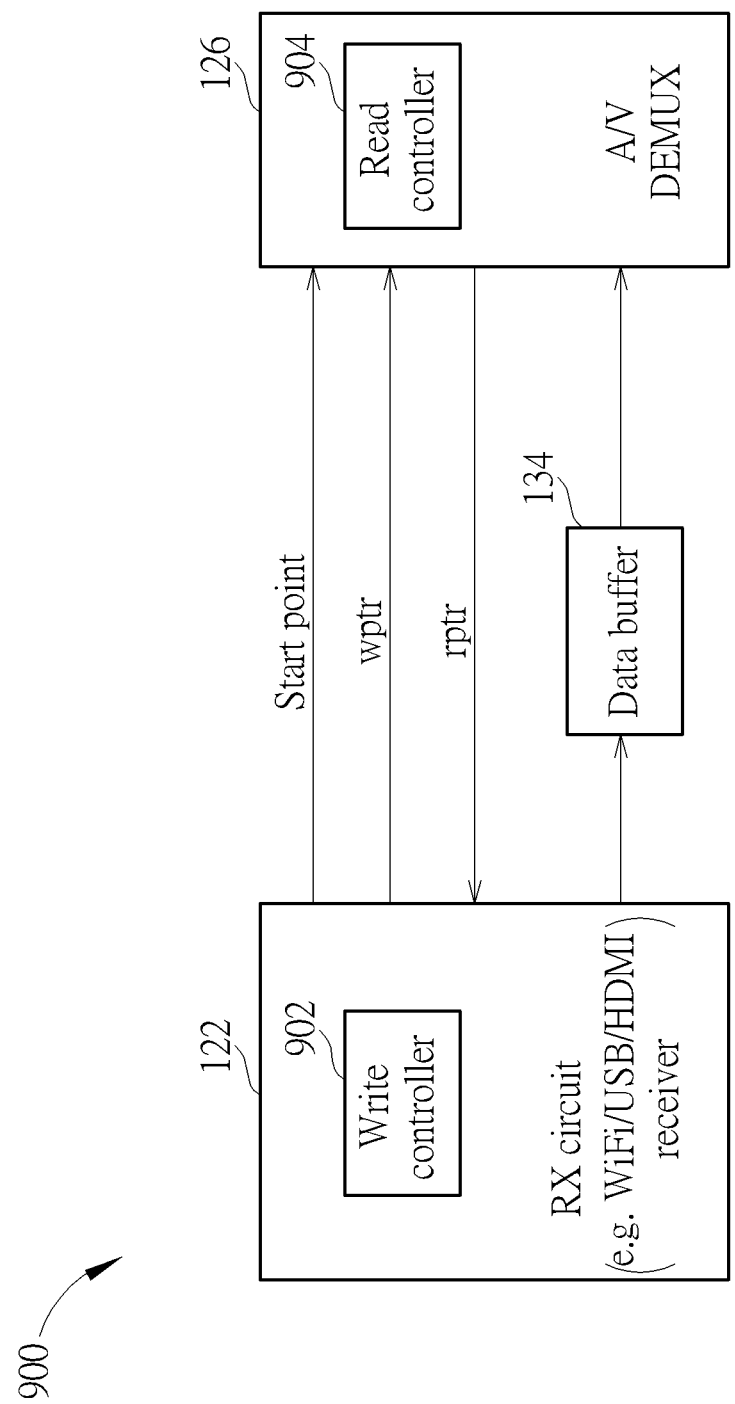
FIG. 9 is a diagram illustrating a third video processing system according to an embodiment of the present invention.
Figure 10:
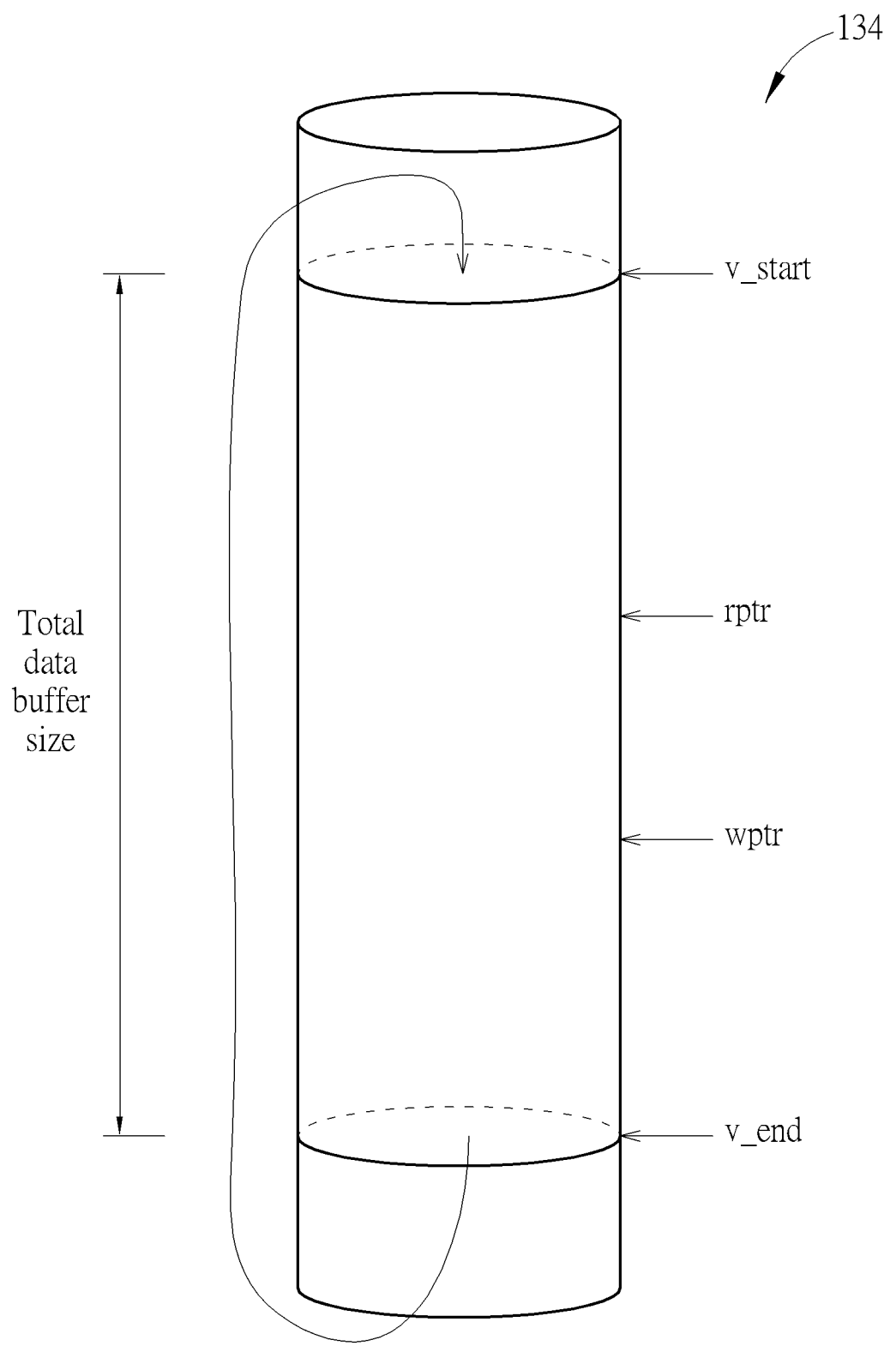
FIG. 10 is a diagram illustrating a data buffer implemented using a ring buffer according to an embodiment of the present invention.

FIG. 9 is a diagram illustrating a third video processing system according to an embodiment of the present invention. The video processing system 900 may be a part of the video receiving system 120 shown in FIG. 1. In this embodiment, the video processing system 900 includes the receiving circuit 122, the audio/video demultiplexing circuit 126, and the data buffer 134. In addition, the data buffer 134 is implemented using a ring buffer as shown in FIG. 10. Further, a racing-mode ring buffer access control scheme is employed to prevent the audio/video demultiplexing circuit 126 from retrieving wrong data from the ring buffer (i.e., data buffer 134), and prevent the receiving circuit 122 from overwriting buffered data that is not processed by the audio/video demultiplexing circuit 126 yet.

In one exemplary design, the communication link 110 shown in FIG. 1 may be a wireless communication link. Hence, the receiving circuit 122 is used to receive the packets from the wireless communication link. For example, the receiving circuit 122 may be a Wireless Fidelity (WiFi) receiver. However, this is for illustrative purposes only, and is not meant to be a limitation of the present invention.

In another exemplary design, the communication link 110 shown in FIG. 1 may be a wired communication link. Hence, the receiving circuit 122 is used to receive the packets from the wired communication link. For example, the receiving circuit 122 may be a Universal Serial Bus (USB) receiver or a High-Definition Multimedia Interface (HDMI) receiver. However, this is for illustrative purposes only, and is not meant to be a limitation of the present invention.

As shown in FIG. 10, the data buffer 134 is a ring buffer having a top address v_start and a bottom address v_end. In one embodiment, the top address v_start and the bottom address v_end may be physical addresses that define a continuous physical storage space. In another embodiment, the top address v_start and the bottom address v_end may be virtual addresses that define a continuous logical storage space. Hence, the total data buffer size is equal to (v_start–v_end). The data buffer 134 can be accessed (read/written) in a direction from the top address v_start to the bottom address v_end and then rolling back to the top address v_start from the bottom address v_end.

During packet receiving of one video frame, the receiving circuit 122 writes payload data of the packets into the data buffer 134, such that a write pointer wptr (which is indicative of a current write address of writing payload data of the packets into the data buffer 134) moves downwards. Specifically, the receiving circuit 122 receives a packet from the communication link 110, and unpacks the received packet to write payload data included in the received packet into the data buffer 134. Hence, the receiving circuit 122 updates the write pointer wptr according to the number of packets received and the size of payload data included in each packet received. When the write pointer wptr reaches the bottom address v_end, the write pointer wptr will roll back to the top address v_start, such that writing payload data of the packets into the data buffer 134 continues seamlessly.

During audio/video demultiplexing of an input data (which includes payload data of at least one of the packets) of one video frame, the audio/video demultiplexing circuit 126 reads the input data from the data buffer 134, such that a read pointer rptr (which is indicative of a current read address of reading the input data from the data buffer 134) moves downwards. When the read pointer rptr reaches the bottom address v_end, the read pointer wptr will roll back to the top address v_start, such that reading the input data from the data buffer 134 continues seamlessly.

After an old data segment stored in the data buffer 134 is read and processed by the audio/video demultiplexing circuit 126, a storage area which buffers the old data segment can be reused to buffer a new data segment generated from the receiving circuit 122. In addition, after the old data segment (which has been read and processed by the audio/video demultiplexing circuit 126) is overwritten by the new data segment generated from the receiving circuit 122, the storage area can be read by the audio/video demultiplexing circuit 126 again to obtain the new data segment. Due to inherent characteristics of the ring buffer, the write pointer wptr chases the read pointer rptr, and the read pointer rptr also chases the write pointer wptr. A racing mode between the read pointer rptr and the write pointer wptr may be employed to control access (read/write) of the data buffer 134 that is a ring buffer. In accordance with the racing-mode ring buffer access control scheme, the audio/video demultiplexing circuit 126 is configured to include a write controller 902 which updates the write pointer wptr to the audio/video demultiplexing circuit 126, and the audio/video demultiplexing circuit 126 is configured to include a read controller 904 which updates the read pointer rptr to the receiving circuit 122.

Figure 11:
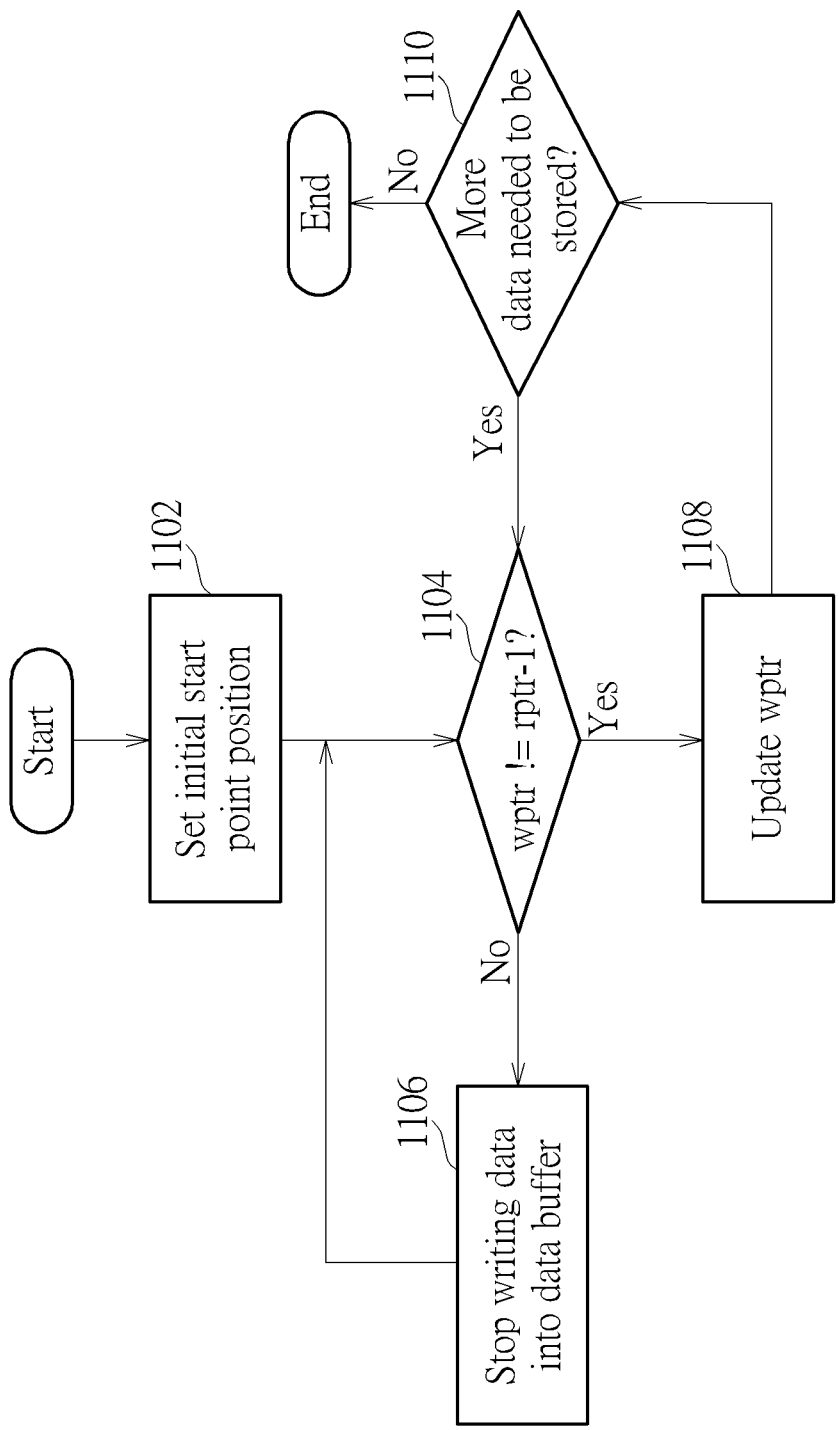
FIG. 11 is a flowchart illustrating a method of controlling a write operation of a data buffer according to an embodiment of the present invention.

FIG. 11 is a flowchart illustrating a method of controlling a write operation of the data buffer 134 according to an embodiment of the present invention. Provided that the result is substantially the same, the steps are not required to be executed in the exact order shown in FIG. 11. The method shown in FIG. 11 may be employed by the write controller 902. At step 1102, the write controller 902 sets an initial start point position, wherein a start point is indicative of a start address of payload data stored in the data buffer 134 by the receiving circuit 122. Since the data buffer 134 is a ring buffer, the initial start point position is set by an address between the top address v_start and the bottom address v_end. In addition, at the beginning of writing payload data of the packets into the data buffer 134, a first data segment of the payload data is written into a memory word addressed by a write address that is the initial start point position.

At step 1104, the write controller 902 compares its write pointer wptr with the received read pointer rptr to check if a distance between the write pointer wptr and the read pointer rptr does not reach a threshold (e.g., wptr !=rptr−1). When the distance between the write pointer wptr and the read pointer rptr does not reach the threshold (e.g., wptr != rptr−1), the write controller 902 can continue or resume writing payload data of the packets into the data buffer 134 (step 1108). In this example, the threshold is equal to a step size of incrementing the write pointer wptr. However, this is for illustrative purposes only, and is not meant to be a limitation of the present invention.

However, when the distance between the write pointer wptr and the read pointer rptr reaches the threshold (e.g., wptr==rptr−1), meaning that the write pointer wptr will catch up the read pointer rptr soon, the write controller 902 stops writing payload data of the packets into the data buffer 134 (step 1106). In this way, the racing-mode ring buffer access control scheme prevents the receiving circuit 122 from overwriting payload data that is not processed by the audio/video demultiplexing circuit 126 yet. The write controller 902 does not resume writing payload data of the packets into the data buffer 134 until the audio/video demultiplexing circuit 126 updates the read pointer rptr to a new value. Hence, when the distance between the write pointer wptr and the read pointer rptr does not reach the threshold (e.g., wptr !=rptr−1) due to the read pointer rptr updated to a new value under a condition that writing payload data of the packets into the data buffer 134 is paused, the write controller 902 resumes writing data of the video bitstream into the data buffer 134 (steps 1104 and 1108).

At step 1108, the write controller 902 updates the write pointer wptr to move the write pointer wptr for writing data of the video bitstream into a next write address of the data buffer 134. For example, the write controller 902 updates the write pointer wptr according to the following pseudo code.

```
if (wptr==v_end)
    wptr = v_start
else
    wptr = wptr+1
```

After payload data is written into the bitstream buffer 136 according to the updated write pointer wptr, the write controller 902 checks if there are more data needed to be stored into the data buffer 134 (step 1110). When there is no data needed to be stored into the data buffer 134, the write operation is ended. Otherwise, the control flow proceeds with step 1104.

Figure 12:
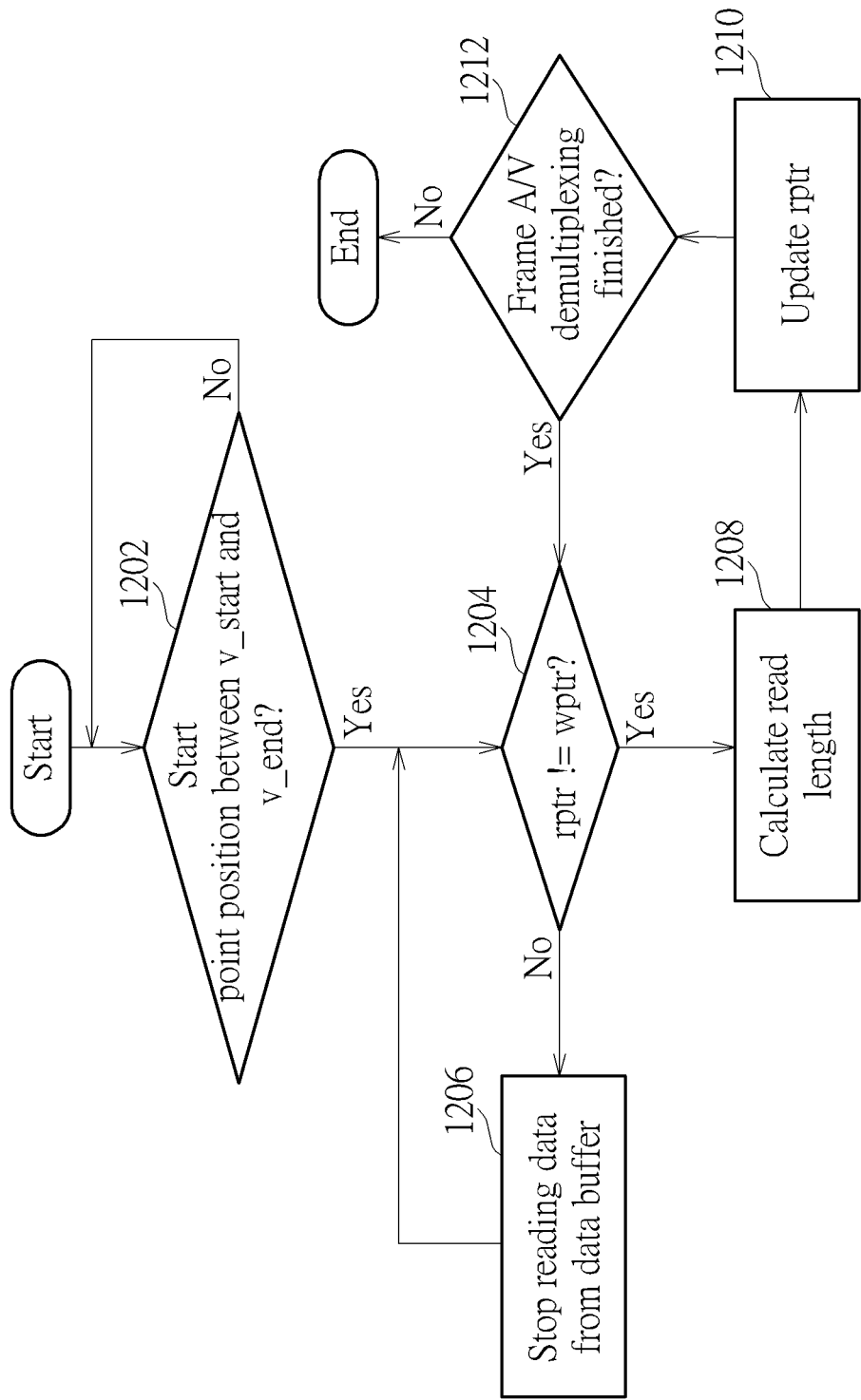
FIG. 12 is a flowchart illustrating a method of controlling a read operation of a data buffer according to an embodiment of the present invention.

FIG. 12 is a flowchart illustrating a method of controlling a read operation of the data buffer 134 according to an embodiment of the present invention. Provided that the result is substantially the same, the steps are not required to be executed in the exact order shown in FIG. 12. The method shown in FIG. 12 may be employed by the read controller 904. At step 1202, the read controller 904 checks if the start point position is between the top address v_start and the bottom address v_end. As mentioned above, a start point is indicative of a start address of payload data stored in the data buffer 134 that is a ring buffer. The racing-mode ring buffer access control scheme is only active when the start point position is between the top address v_start and the bottom address v_end. Hence, the control flow proceeds with step 1204 when the start point position is between the top address v_start and the bottom address v_end.

At step 1204, the read controller 904 compares its read pointer rptr with the received write pointer wptr to check if the read pointer rptr does not catch up the write pointer wptr (e.g., rptr !=wptr). When the read pointer rptr does not catch up the write pointer wptr (e.g., rptr !=wptr), the read controller 204 can continue or resume reading payload data of the packets from the data buffer 134 (step 1208).

However, when the read point rptr catches up the write pointer wptr (e.g., rptr==wptr), the read controller 904 stops reading payload data of the packets from the data buffer 134 (step 1206). In this way, the racing-mode ring buffer access control scheme prevents the audio/video demultiplexing circuit 126 from retrieving wrong payload data from the data buffer 134. The read controller 904 does not resume reading payload data of the packets from the data buffer 134 until the receiving circuit 122 updates the write pointer wptr to a new value. Hence, when the read pointer rptr does not catch up the write pointer wptr (e.g., rptr !=wptr) due to the write pointer wptr updated to a new value under a condition that reading payload data of the packets from the data buffer 134 is paused, the read controller 904 resumes reading payload data of the packets from the data buffer 134 (steps 1204 and 1208).

At step 1208, the read controller 204 calculates a read length which indicates an amount of data still waiting to be fetched from the data buffer 134 to the audio/video demultiplexing circuit 126 for further processing. For example, the read controller 904 calculates the read length according to the following pseudo code.

```
if (wptr < rptr)
    length = (v_end-rptr) + (wptr-v_start)
else
    length = wptr-rptr
```

At step 1210, the read controller 904 updates the read pointer rptr to move the read pointer rptr for reading payload data of the packets from a next read address of the data buffer 134. For example, the read controller 904 updates the read pointer rptr according to the following pseudo code.

```
if (rptr==v_end)
    rptr = v_start
else
    rptr = rptr+1
```

After payload data is read from the data buffer 134 according to the updated read pointer rptr, the read controller 904 checks if the frame audio/video demultiplexing operation is finished (step 1212). When the frame audio/video demultiplexing operation is finished, the read operation is ended. Otherwise, the control flow proceeds with step 1204.

To achieve smooth video playback, a read operation of the display buffer 138 cannot be paused. However, due to certain factors, it is possible that the video decoder 128 is unable to provide some pixel data of one reconstructed video frame in time. For example, the decoding speed becomes unstable because of the bandwidth variation of the communication link (e.g., a wired communication link or a wireless communication link) 110 between the video transmission system 100 and the video receiving system 120. When the reconstructed pixel data of a portion of a reconstructed video frame are not ready at the time the display engine 130 starts driving the display device 140 to display the portion of the reconstructed video frame, a broken picture may be displayed on the display device 140, thus resulting in a poor video quality. To prevent the display device 140 from displaying a broken picture, the present invention further proposes a frame base address switching scheme.

Figure 13:
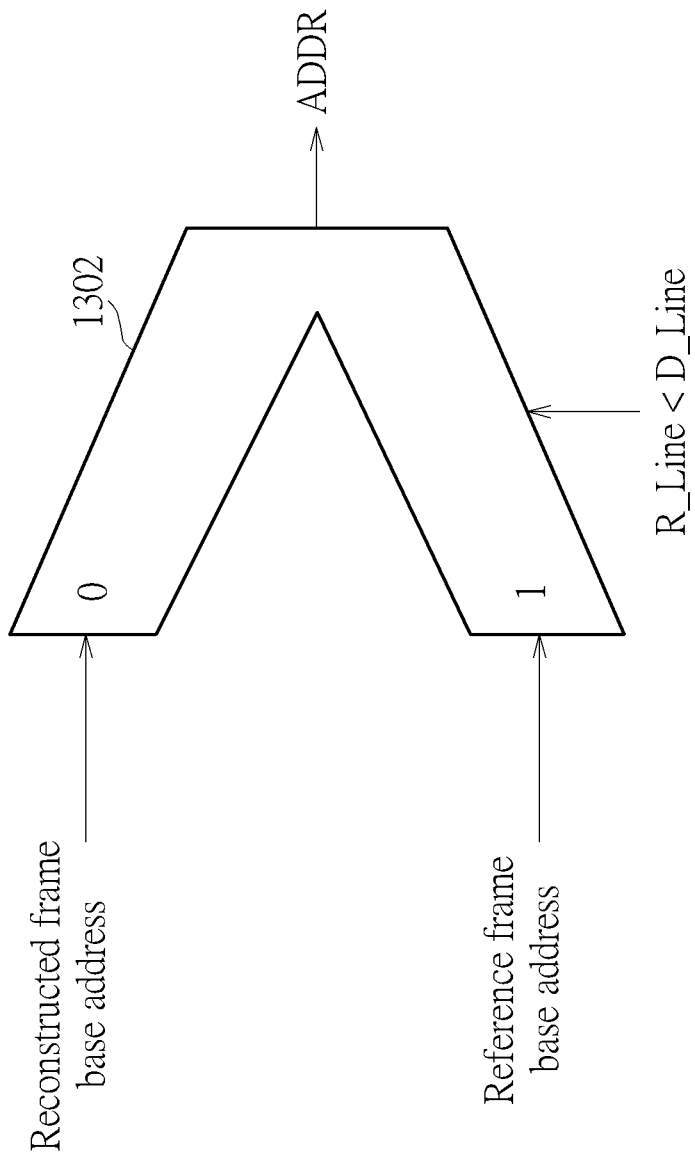
FIG. 13 is a diagram illustrating a frame base address switching circuit according to an embodiment of the present invention.

Please refer to FIG. 6 in conjunction with FIG. 13. FIG. 13 is a diagram illustrating a frame base address switching circuit according to an embodiment of the present invention. The frame base address switching circuit 1302 is apart of the display control circuit 132 shown in FIG. 1 and FIG. 6. As mentioned above, the display buffer 138 is used to buffer pixel data of a reconstructed frame (which is a current frame being decoded), and the reference frame buffer 139 is used to buffer one or more reference frames (which are previous frames already decoded). In this embodiment, the frame base address switching circuit 1302 may be implemented using a multiplexer having a first input port used to receive a reconstructed frame base address, a second input port used to receive a reference frame base address, and an output port used to selectively output the reconstructed frame base address or the reference frame base address as the frame base address ADDR used by the display engine 130. As shown in FIG. 13, the frame base address switching circuit 1302 is controlled by a result of comparing the reconstructed line count value R_Line maintained by the reconstructed line counter 602 and the displayed line count value D_Line maintained by the displayed line counter 604. When the reconstructed line count value R_Line is smaller than the displayed line count value D_Line, meaning that the video decoder 128 fails to provide the needed pixel line data in time, the frame base address switching circuit 1302 selects the reference frame base address as the frame base address ADDR. When the reconstructed line count value R_Line is not smaller than the displayed line count value D_Line, meaning that the video decoder 128 can provide the needed pixel line data in time, the frame base address switching circuit 1302 selects the reconstructed frame base address as the frame base address ADDR.

The reconstructed frame base address is indicative of a start address of a reconstructed video frame (which is a current frame being decoded) stored in the display buffer 138. The reference frame base address is indicative of a start address of a reference video frame (which is a previous frame already decoded) stored in the reference frame buffer 139. As shown in FIG. 6, the frame base address ADDR is supplied from the display control circuit 132 to the display engine 130. When the frame base address ADDR is set by the reconstructed frame base address, the display engine 130 fetches pixel data of a reconstructed video frame (which is a current frame being decoded) from the display buffer 138 according to the frame base address ADDR, and drives the display device 140 according to the pixel data of the reconstructed video frame (which is a current frame being decoded). When the frame base address ADDR is set by the reference frame base address, the display engine 130 fetches pixel data of a reference frame (which is a previous frame already decoded) from the reference frame buffer 139 according to the frame base address ADDR, and drives the display device 140 according to the pixel data of the reference frame (which is a previous frame already decoded).

Figure 14:
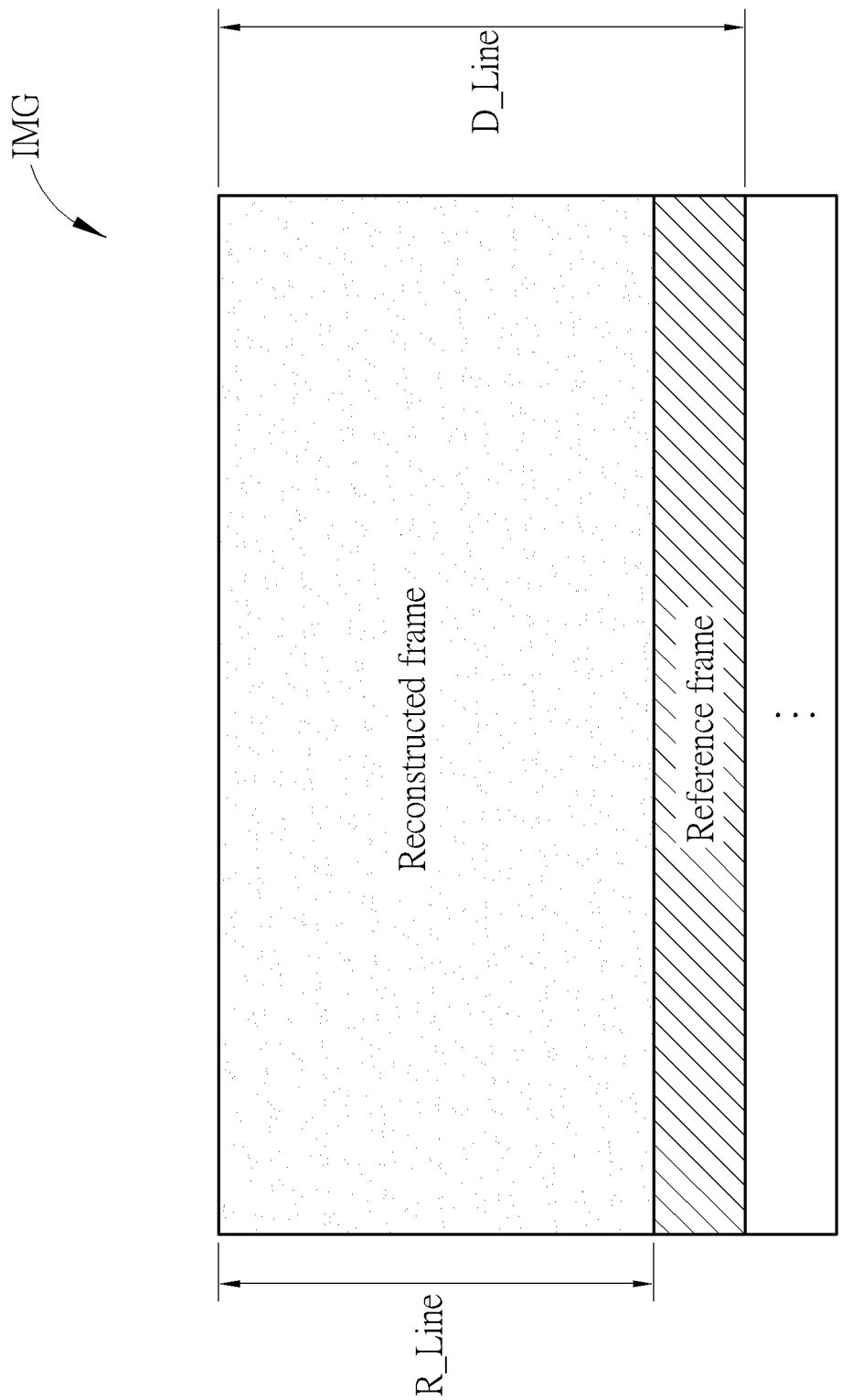
FIG. 14 is a diagram illustrating a video frame displayed on a display device according to an embodiment of the present invention.

When the decoding speed is stable during video playback of the whole of a current video frame, the display device 140 will display the current video frame completely. However, when the decoding speed is only stable during video playback of a portion of a current video frame, the display device 140 displays the portion of the current video frame and further displays a portion of a previous video frame. FIG. 14 is a diagram illustrating a video frame displayed on the display device 140 according to an embodiment of the present invention. The displayed video frame IMG is composed of a partial reconstructed frame and a partial reference frame. Before the reconstructed line count value R_Line becomes smaller than the displayed line count value D_Line, pixel data of a reconstructed video frame (which is a current frame being decoded) are displayed on a first region of the display device 140 through the display engine 130 using the frame base address ADDR set by the reconstructed frame base address. After the reconstructed line count value R_Line becomes smaller than the displayed line count value D_Line, pixel data of a reference frame (which is a previous frame already decoded) are displayed on a second region of the display device 140 through the display engine 130 using the frame base address ADDR set by the reference frame base address. With the help of automatically switching from the reconstructed frame base address to the reference frame base address, no broken picture is displayed on the display device 140 when the decoding speed is unstable due to the bandwidth variation between the video transmitting system 100 and the video receiving system 120.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing system comprising:
a storage device, comprising:
a data buffer;
a bitstream buffer; and
a display buffer;
a receiving circuit, arranged to receive packets and unpack the packets to write payload data of the packets into the data buffer;
an audio/video demultiplexing circuit, arranged to fetch an input data from the data buffer, and perform an audio/video demultiplexing operation upon the fetched input data to write data of a video bitstream into the bitstream buffer, wherein the fetched input data comprise payload data of at least one of the packets;
a video decoder, arranged to fetch data of the video bitstream from the bitstream buffer, and perform a video decoding operation upon the fetched data of the video bitstream to write pixel data of a reconstructed video frame into the display buffer; and
a display engine, arranged to fetch pixel data of the reconstructed video frame from the display buffer, and drive a display device according to the fetched pixel data of the reconstructed video frame;
wherein the data buffer is a ring buffer coupled between the receiving circuit and the audio/video demultiplexing circuit, the bitstream buffer is a ring buffer coupled between the audio/video demultiplexing circuit and the video decoder, and the display buffer is a ring buffer coupled between the video decoder and the display engine; and
wherein the video decoder comprises a first counter arranged to maintain a first count value indicative of a number of pixel lines that are reconstructed by the video decoder; the first counter adjusts the first count value each time one coding block row is completely decoded, where said one coding block row includes pixels in a column direction; the display engine comprises a second counter arranged to maintain a second count value indicative of a number of pixel lines that are displayed on the display device through the display engine; the second counter adjusts the second count value each time one pixel line is completely displayed; and the video processing system further comprises:
a display control circuit, arranged to receive the first count value from the video decoder, receive the second count value from the display engine, and refer to the first count value and the second count value to control the display engine.

2. The video processing system of claim 1, wherein the audio/video demultiplexing circuit is further arranged to update a first write pointer to the video decoder, where the first write pointer is indicative of a current write address of writing data of the video bitstream into the bitstream buffer by the audio/video demultiplexing circuit; and the video decoder comprises:
a first read controller, arranged to compare the first write pointer with a first read pointer, and stop fetching data of the video bitstream from the bitstream buffer when the first read pointer catches up the first write pointer, where the first read pointer is indicative of a current read address of fetching data of the video bitstream from the bitstream buffer by the video decoder; and
wherein the receiving circuit is further arranged to update a second write pointer to the audio/video demultiplexing circuit, where the second write pointer is indicative of a current write address of writing payload data into the data buffer by the receiving circuit; and the audio/video demultiplexing circuit comprises:
a second read controller, arranged to compare the second write pointer with a second read pointer, and stop fetching payload data from the data buffer when the second read pointer catches up the second write pointer, where the second read pointer is indicative of a current read address of fetching payload data from the data buffer by the audio/video demultiplexing circuit.

3. The video processing system of claim 2, wherein the first read controller does not resume fetching data of the video bitstream from the bitstream buffer until the audio/video demultiplexing circuit updates the first write pointer to a new value, and the second read controller does not resume fetching payload data from the data buffer until the receiving circuit updates the second write pointer to a new value.

4. The video processing system of claim 1, wherein the receiving circuit receives the packets transmitted via a wireless communication link.

5. The video processing system of claim 4, wherein the receiving circuit is a Wireless Fidelity (WiFi) receiver.

6. The video processing system of claim 1, wherein the receiving circuit receives the packets transmitted via a wired communication link.

7. The video processing system of claim 6, wherein the receiving circuit is a Universal Serial Bus (USB) receiver or a High-Definition Multimedia Interface (HDMI) receiver.

8. A video processing system comprising:
a storage device, comprising:
a data buffer;
a bitstream buffer; and
a display buffer;
a receiving circuit, arranged to receive packets and unpack the packets to write payload data of the packets into the data buffer;
an audio/video demultiplexing circuit, arranged to fetch an input data from the data buffer, and perform an audio/video demultiplexing operation upon the fetched input data to write data of a video bitstream into the bitstream buffer, wherein the fetched input data comprise payload data of at least one of the packets;
a video decoder, arranged to fetch data of the video bitstream from the bitstream buffer, and perform a video decoding operation upon the fetched data of the video bitstream to write pixel data of a reconstructed video frame into the display buffer; and
a display engine, arranged to fetch pixel data of the reconstructed video frame from the display buffer, and drive a display device according to the fetched pixel data of the reconstructed video frame;
wherein the data buffer is a ring buffer coupled between the receiving circuit and the audio/video demultiplexing circuit, the bitstream buffer is a ring buffer coupled between the audio/video demultiplexing circuit and the video decoder, and the display buffer is a ring buffer coupled between the video decoder and the display engine;
wherein the video decoder comprises a first counter arranged to maintain a first count value indicative of a number of pixel lines that are reconstructed by the video decoder; the first counter adjusts the first count value each time one coding block row is completely decoded, where said one coding block row includes pixels in a column direction; the display engine comprises a second counter arranged to maintain a second count value indicative of a number of pixel lines that are displayed on the display device through the display engine; the second counter adjusts the second count value each time one pixel line is completely displayed;
and the video processing system further comprises:
a display control circuit, arranged to receive the first count value from the video decoder, receive the second count value from the display engine, compare the first count value with the second count value, and instruct the video decoder to stop writing pixel data of the reconstructed video frame into the display buffer when a distance between the first count value and the second count value reaches a threshold.

9. The video processing system of claim 8, wherein the video decoder is further arranged to update a first read pointer to the audio/video demultiplexing circuit, where the first read pointer is indicative of a current read address of fetching data of the video bitstream from the bitstream buffer by the video decoder; and the audio/video demultiplexing circuit comprises:
a first write controller, arranged to compare the first read pointer with a first write pointer, and stop writing data of the video bitstream into the bitstream buffer when a distance between the first write pointer and the first read pointer reaches a first threshold, where the first write pointer is indicative of a current write address of writing data of the video bitstream into the bitstream buffer by the audio/video demultiplexing circuit;
wherein the audio/video demultiplexing circuit is further arranged to update a second read pointer to the receiving circuit, where the second read pointer is indicative of a current read address of fetching payload data from the data buffer by the audio/video demultiplexing circuit and the receiving circuit comprises:
a second write controller, arranged to compare the second read pointer with a second write pointer, and stop writing payload data into the data buffer when a distance between the second write pointer and the second read pointer reaches a second threshold, where the second write pointer is indicative of a current write address of writing payload data into the data buffer by the receiving circuit; and
wherein the first write controller stops writing data of the video bitstream into the bitstream buffer when the first write pointer lags behind the first read pointer by the first threshold that is equal to a unit increment of the second write pointer, and the second write controller stops writing payload data into the data buffer when the second write pointer lags behind the second read pointer by the second threshold that is equal to a unit increment of the second write pointer.

10. The video processing system of claim 8, wherein the video decoder is further arranged to update a first read pointer to the audio/video demultiplexing circuit, where the first read pointer is indicative of a current read address of fetching data of the video bitstream from the bitstream buffer by the video decoder; and the audio/video demultiplexing circuit comprises:
a first write controller, arranged to compare the first read pointer with a first write pointer, and stop writing data of the video bitstream into the bitstream buffer when a distance between the first write pointer and the first read pointer reaches a first threshold, where the first write pointer is indicative of a current write address of writing data of the video bitstream into the bitstream buffer by the audio/video demultiplexing circuit;
wherein the audio/video demultiplexing circuit is further arranged to update a second read pointer to the receiving circuit, where the second read pointer is indicative of a current read address of fetching payload data from the data buffer by the audio/video demultiplexing circuit and the receiving circuit comprises:
a second write controller, arranged to compare the second read pointer with a second write pointer, and stop writing payload data into the data buffer when a distance between the second write pointer and the second read pointer reaches a second threshold, where the second write pointer is indicative of a current write address of writing payload data into the data buffer by the receiving circuit; and
wherein the first write controller does not resume writing data of the video bitstream into the bitstream buffer until the video decoder updates the first read pointer to a new value; the display control circuit does not instruct the video decoder to resume writing pixel data of the reconstructed video frame into the display buffer until the second count value is updated to a new value; and the second write controller does not resume writing payload data into the data buffer until the audio/video demultiplexing circuit updates the second read pointer to a new value.

* * * * *